US012784709B2

(12) United States Patent
Wariishi et al.

(10) Patent No.: US 12,784,709 B2
(45) Date of Patent: Nov. 3, 2026

(54) MEDICAL SUPPORT SYSTEM

(71) Applicant: Canon Kabushiki Kaisha, Tokyo (JP)

(72) Inventors: Nao Wariishi, Nasushiobara (JP); Hiroki Saito, Oyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 550 days.

(21) Appl. No.: 18/298,480

(22) Filed: Apr. 11, 2023

(65) Prior Publication Data

US 2023/0368749 A1 Nov. 16, 2023

(30) Foreign Application Priority Data

May 13, 2022 (JP) ................................ 2022-079542

(51) Int. Cl.
*G09G 5/04* (2006.01)

(52) U.S. Cl.
CPC ....... *G09G 5/04* (2013.01); *G09G 2320/0666* (2013.01); *G09G 2380/08* (2013.01)

(58) Field of Classification Search
None
See application file for complete search history.

(56) References Cited

U.S. PATENT DOCUMENTS

2007/0277102 A1* 11/2007 Kanzaki ................ G06F 16/986 715/210
2015/0227710 A1* 8/2015 Pappada ................ G16H 70/20 705/2
2018/0350453 A1* 12/2018 Nag ....................... G16H 40/63
2020/0121199 A1* 4/2020 Freeman .............. A61B 5/4875

FOREIGN PATENT DOCUMENTS

JP 2017-151515 A 8/2017
JP 2019-200770 A 11/2019

OTHER PUBLICATIONS

Office Action issued Mar. 3, 2026, in corresponding Japanese Patent Application No. 2022-079542, 8 pages.

* cited by examiner

*Primary Examiner* — Paul B Yanchus, III
(74) *Attorney, Agent, or Firm* — Oblon, McClelland, Maier & Neustadt, L.L.P.

(57) ABSTRACT

A medical support system includes a processing circuit configured to: acquire medical data on a specific patient over time; cause a display to display a display screen on which one or more measurement values in the medical data are displayed; detect an alert value that satisfies a determination condition from the one or more measurement values included in the medical data every time the medical data is acquired; and highlight a warning area in which the alert value is displayed on the display screen, and change a dept of a background color of the warning area in accordance with an importance degree relating to the alert value.

7 Claims, 11 Drawing Sheets

MEDICAL SUPPORT SYSTEM

CROSS-REFERENCE TO RELATED APPLICATIONS

This application is based upon and claims the benefit of priority from Japanese Patent Application No. 2022-079542, filed May 13, 2022, the entire contents of which are incorporated herein by reference.

FIELD

Embodiments described herein relate generally to a medical support system.

BACKGROUND

Conventionally, a medical information integrative viewer for use in emergency medical care gives an alert (warning) in the case where medical data such as results of laboratory tests, vital signs, etc. satisfies a predetermined condition. For example, in response to a user pressing a button, if a value of medical data currently displayed on a screen exceeds a specific threshold value, a corresponding portion is highlighted. By such a display method, a user can grasp the fact that an alert has occurred for any piece of data; however, he or she cannot easily grasp an importance degree of the alert that has occurred.

DETAILED DESCRIPTION

In general, according to one embodiment, a medical support system includes a processing circuit configured to: acquire medical data on a specific patient over time; cause a display to display a display screen on which one or more measurement values in the medical data are displayed; detect an alert value that satisfies a determination condition from the one or more measurement values included in the medical data every time the medical data is acquired; and highlight a warning area in which the alert value is displayed on the display screen, and change a dept of a background color of the warning area in accordance with an importance degree relating to the alert value.

Hereinafter, embodiments of a medical support system will be described in detail with reference to the accompanying drawings. In the following description, structural elements having approximately the same function and configuration will be assigned the same reference symbol, and a repeat description will be given only where necessary.

First Embodiment

Figure 1:
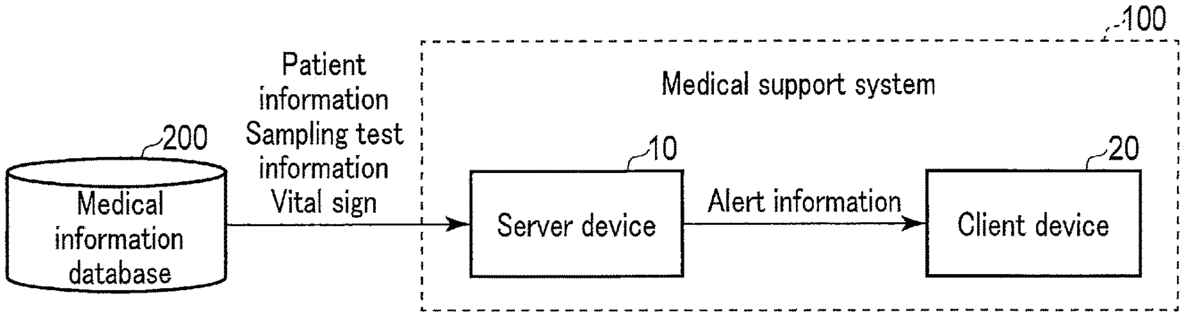
FIG. 1 is a diagram showing an example of a configuration of a medical support system according to a first embodiment.

FIG. 1 is a diagram showing a configuration of a medical support system 100. The medical support system 100 supports and manages medical care for emergency patients. The medical support system 100 is connected to a medical information database 200 via a network. The medical support system 100 is capable of transmitting and receiving various information to and from the medical information database 200 via the network.

The network is, for example, a Local Area Network (LAN). The connection to the network may be established in either a wired or wireless manner. Furthermore, as long as security is ensured by means of a Virtual Private Network (VPN), etc., a line to be connected is not necessarily a LAN. A connection to the Internet or other public communication network may be established.

The medical information database 200 stores and manages medical data on emergency patients. The medical data includes, for example, patient information, sampling test information, and vital information.

The patient information is information about an emergency patient. The patient information includes information on a patient's name, gender, age, nationality, medical history, and a test, a result of a medical examination, a medical image, etc.

The sampling test information is information relating to a sampling test. The sampling test is, for example, a blood test. The sampling test information includes a sampling test item name, a test method, a test date and time, a test result, etc. A sampling test result includes a hemoglobin concentration (ctHb), oxygen saturation (SpO2), a P/F ratio, a lactate level (cLac), etc.

The vital information is information on a measurement result of a vital sign, and includes, for example, a measurement value of the vital sign. Measurement values of a vital sign include a heart rate (HR), an upper blood pressure value (ABP S), an average blood pressure value (ABP M), a lower blood pressure value (ABP D), etc. The measurement values of a vital sign may include other given measurement values.

The medical information database 200 is connected, via a network, to a patient information system (not shown) that manages the patient information and the sampling test information, a vital sign manager (not shown) that manages a vital sign transmitted from a vital sign measurer attached to a patient, etc. The medical information database 200 acquires the patient information and the sampling test information from the patient information system every several tens of minutes, for example. The medical information database 200 further acquires the vital information from the vital sign manager every second, for example. An interval at which the sampling test information is acquired is set to, for example, an interval at which the sampling test result is updated. Since the vital sign is constantly measured, the vital information is preferably acquired every few seconds.

The medical support system 100 includes a server device 10 and a client device 20. The server device 10 is, for example, a server installed in an emergency medical facility. For example, the server device 10 receives a patient's medical data from the medical information database 200, and performs predetermined data processing on the received medical data. Furthermore, the server device 10 detects a measurement value indicating an abnormal value (hereinafter referred to as an alert value) by executing alert processing based on medical data, and transmits alert information including a detection result of the alert value, to the client device 20. The client device 20 is, for example, a terminal device installed in an emergency room. The client device 20 receives the data-processed medical data and alert information from the server device 10, and highlights the display screen corresponding to the medical data based on the alert information.

Next, a configuration of the server device 10 will be described.

Figure 2:
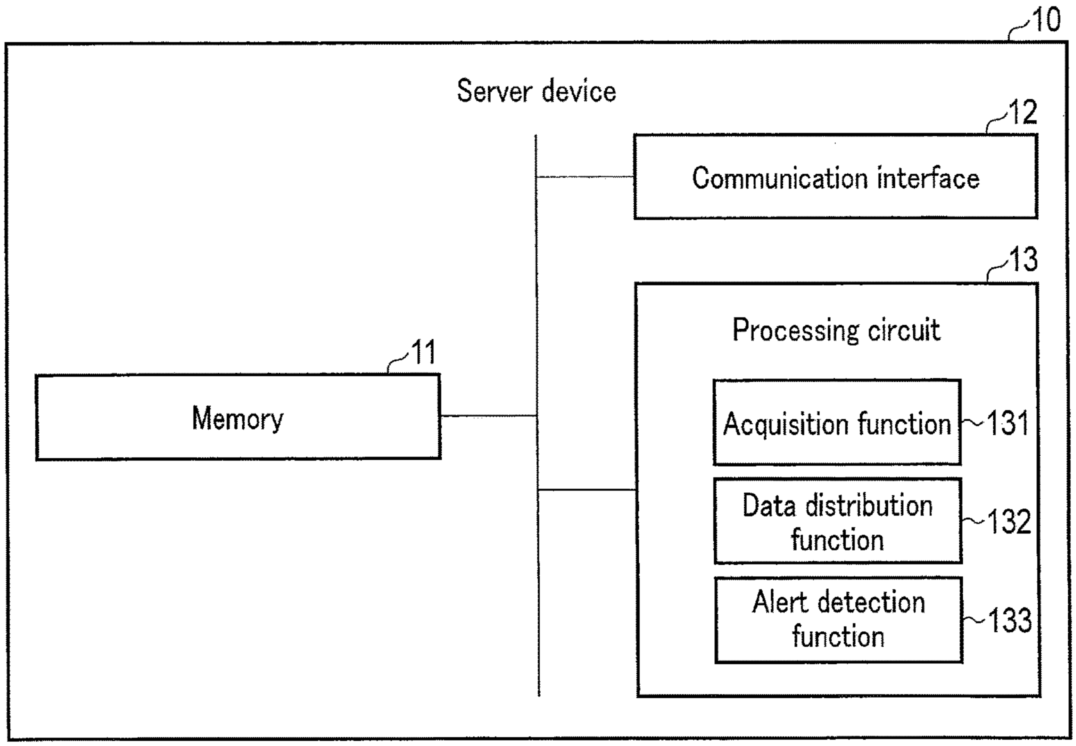
FIG. 2 is a diagram showing an example of a configuration of a server device according to the first embodiment.

FIG. 2 is a diagram showing the configuration of the server device 10. The server device 10 has a memory 11, a communication interface 12, a display 23, an input interface 24, and a processing circuit 13. Hereinafter, the server device 10 will be described as a single device that executes a plurality of functions; however, these functions may be executed by separate devices. For example, the functions executed by the server device 10 may be mounted in different console devices or work station devices in a distributed manner.

The memory 11 is a storage device such as a hard disk drive (HDD), a solid state drive (SSD), or an integrated circuit which stores various types of information. Other than the HDD and SSD, the memory 11 may be a portable storage medium such as a compact disc (CD), a digital versatile disc (DVD), a flash memory, etc. Alternatively, the memory 11 may be a driver that writes and reads various types of information to and from a semiconductor memory such as a flash memory, a random-access memory (RAM), etc. The storage area of the memory 11 may be in the server device 10 or in an external storage device connected via a network.

The memory 11 stores a program to be executed by the processing circuit 13, various types of data to be used for the processing by the processing circuit 13, etc. Such a program may be installed in advance in a computer from a network or a non-transitory computer-readable storage medium, for example, so that the program will cause the computer to implement the respective functions of the processing circuit 13. The various types of data handled in this disclosure are typically digital data. The memory 11 is one example of a storage.

The communication interface 12 is a network interface configured to control communications between the client device 20, the medical information database 200, and an external device via a network.

The processing circuit 13 controls the overall operation of the server device 10. The processing circuit 13 is a processor configured to, upon calling up and executing a program from the memory 11, implement an acquisition function 131, a data distribution function 132, and an alert detection function 133.

The term "processor" used herein refers to, for example, a central processing unit (CPU) or a graphics processing unit (GPU), or a circuit such as an application-specific integrated circuit (ASIC), a programmable logic device (such as a simple programmable logic device (SPLD)), a complex programmable logic device (CPLD), a field programmable gate array (FPGA)), etc. In the case of the processor being a CPU, for example, the processor realizes a function by reading and executing a program stored in a storage circuit. On the other hand, in the case of the processor being, for example, an ASIC, instead of a program being stored in a storage circuit, a corresponding function is directly incorporated as a logic circuit in the circuit of the processor. Each processor of the present embodiment is not limited to a configuration as a single circuit; a plurality of independent circuits may be combined into one processor to realize the functions of the processor. Furthermore, multiple structural elements shown in FIG. 1, 2, or 3 may be integrated as one processor to realize their functions. The above description of the "processor" is applicable to the subsequent embodiments and modifications.

FIG. 1 assumes that the single processing circuit 13 realizes the acquisition function 131, the data distribution function 132, and the alert detection function 133; however, the processing circuit may be configured by a combination of a plurality of independent processors, and the functions may be realized by the processors executing the programs. The acquisition function 131, the data distribution function 132, and the alert detection function 133 may be implemented as individual hardware circuits. The above description of each of the functions executed by the processing circuit 13 is applicable to the embodiments and modifications described below.

The description assumes that the server device 10 executes multiple functions with a single console; however, these functions may be implemented by separate devices. For example, the functions of the processing circuit 13 may be mounted in different devices in a distributed manner.

The processing circuit 13 acquires, through the acquisition function 131, the medical data on an emergency patient. The processing circuit 13 acquires, as the medical data, the patient information, the sampling test information, and the vital information. As described above, the patient information and the sampling test information are acquired from the medical information database 200 every several tens of minutes, and the vital information is acquired from the medical information database 200 every second. The processing circuit 13 that realizes the acquisition function 131 is one example of the acquirer.

The processing circuit 13 performs, through the data distribution function 132, predetermined data processing on acquired medical data in a batch and transmits the data-processed medical data to the client device 20 via the communication interface 12. The processing circuit 13 that realizes the data distribution function 132 is one example of a data distributer.

The processing circuit 13 executes, through the alert detection function 133, the alert processing based on the medical data. In execution of the alert processing, every time the medical data is acquired through the acquisition function 131, the processing circuit 13 detects a measurement value (hereinafter referred to as an alert value) that satisfies a determination condition (hereinafter referred to as an alert condition) relating to an alert from measurement values included in the medical data. The alert condition is a condition for determining whether the measurement value is abnormal or not. The alert condition is set for each item of the medical data. The alert condition is a conditional expression representing, for example, a magnitude relationship with a threshold value, a range of normal values, etc. The alert condition is prestored in the memory 11, for example. The processing circuit 13 transmits the alert information including a detection result of the alert value to the client device 20 via the communication interface 12. The alert information includes, in addition to an alert value, a name of an item for which the alert value has been detected (hereinafter referred to as an alert item), and an alert condition for the alert item. The processing circuit 13 that realizes the alert detection function 133 is one example of the detector.

Next, a configuration of the client device 20 will be described.

Figure 3:
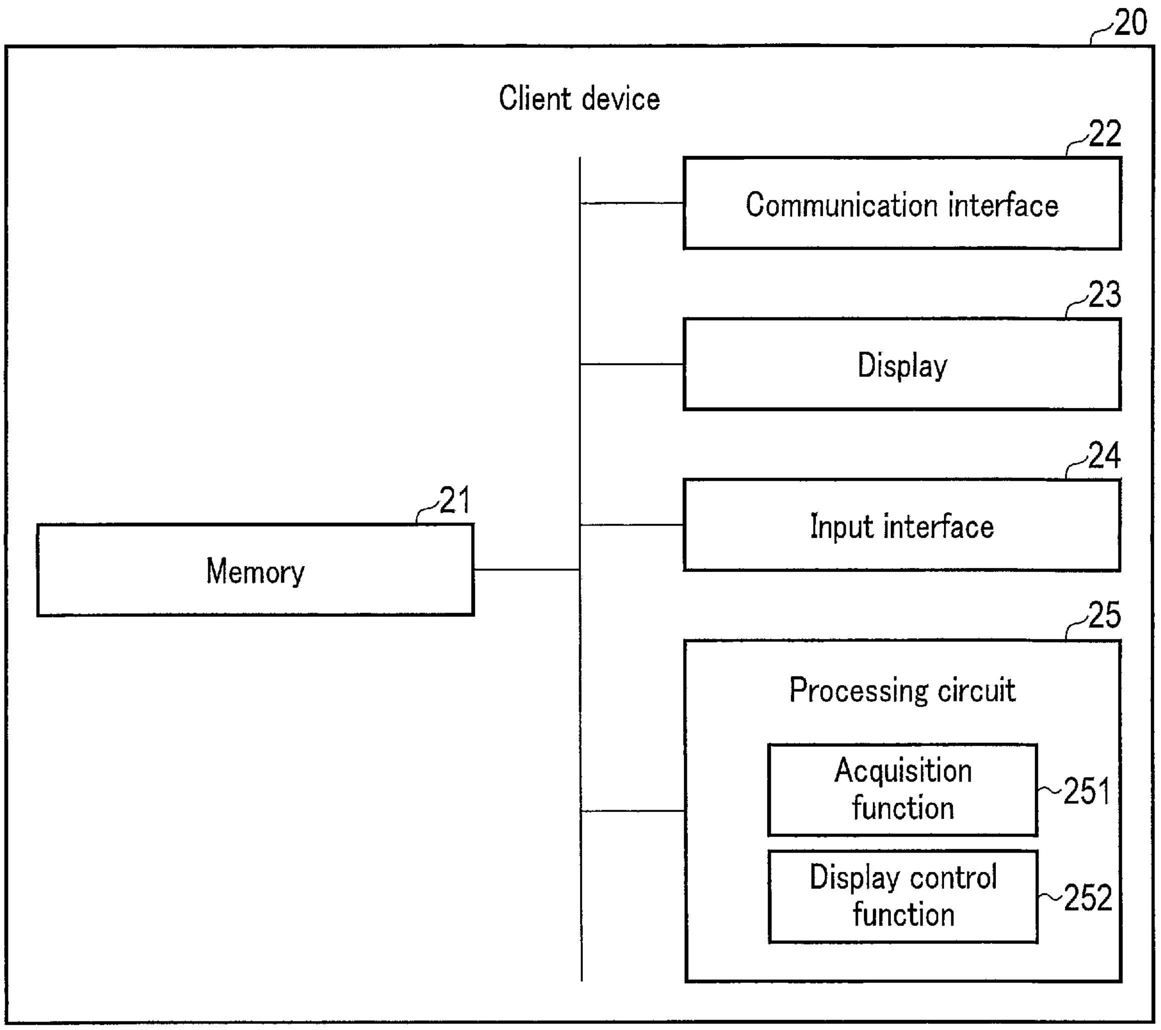
FIG. 3 is a diagram showing an example of a configuration of a client device according to the first embodiment.

FIG. 3 is a diagram showing the configuration of the client device 20. The client device 20 includes the memory 21, a communication interface 22, the display 23, the input interface 24, and a processing circuit 25. Hereinafter, the client device 20 will be described as a single device that executes a plurality of functions; however, these functions may be executed by separate devices. For example, the functions executed by the client device 20 may be provided in different console devices or work station devices in a distributed manner.

The memory 21 is a storage device such as a hard disk drive (HDD), a solid state drive (SSD), or an integrated circuit which stores various types of information. Other than the HDD and SSD, the memory 21 may be a portable storage medium such as a compact disc (CD), a digital versatile disc (DVD), a flash memory, etc. Alternatively, the memory 21 may be a driver that writes and reads various types of information to and from a semiconductor memory such as a flash memory, a random-access memory (RAM), etc. The storage area of the memory 21 may be in the client device 20 or in an external storage device connected via a network.

The memory 21 stores a program to be executed by the processing circuit 25, various types of data to be used for the processing by the processing circuit 25, etc. Such a program may be installed in advance in a computer from a network or a non-transitory computer-readable storage medium, for example, so that the program will cause the computer to implement the respective functions of the processing circuit 25. Various types of data handled in this disclosure are typically digital data. The memory 21 is another example of the storage.

The communication interface 22 is a network interface configured to control communications between the client device 20, the medical information database 200, and an external device via a network.

The display 23 is configured to display various types of information. For example, the display 23 outputs medical information generated by the processing circuit 25, a graphical user interface (GUI) for receiving various operations from an operator, etc. For example, the display 23 is a liquid crystal display or a cathode ray tube (CRT) display. The display 23 is one example of a displayer.

The input interface 24 receives various input operations from an operator, converts the received input operations into electric signals, and outputs the converted electric signals to the processing circuit 25. For example, the input interface 24 receives input of medical information, input of various command signals, etc., from the operator. The input interface 24 is implemented by a mouse and keyboard for executing various types of processing of the processing circuit 25, a trackball, a switch button, a touch screen in which a display screen and a touch pad are integrated, a non-contact input circuit using an optical sensor, a voice input circuit, etc. The input interface 24 is connected to the processing circuit 25, converts an input operation received from an operator into an electric signal, and outputs the converted electric signal to the control circuit. In this disclosure, the input interface is not limited to one provided with physical operating components such as a mouse and a keyboard. Examples of the input interface include an electric-signal processing circuit that receives an electric signal corresponding to an input operation from an external input device provided separately from the client device, and outputs the received electric signal to the processing circuit 25. The input interface 24 is one example of an inputter.

The processing circuit 25 controls the overall operation of the client device 20. The processing circuit 25 is a processor configured to, upon calling up and executing a program from the memory 21, implement an acquisition function 251 and a display control function 252.

FIG. 1 assumes that the single processing circuit 25 realizes the acquisition function 251 and the display control function 252; however, the processing circuit may be configured by a combination of a plurality of independent processors, and the functions may be realized by the processors executing the programs. The acquisition function 251 and the display control function 252 may be implemented as individual hardware circuits. The above description of the functions executed by the processing circuit 25 is applicable to the embodiments and modifications described below.

The description assumes that the client device 20 executes multiple functions with a single console; however, these functions may be implemented by separate devices. For example, the functions executed by the processing circuit 25 may be provided in different devices in a distributed manner.

The processing circuit 25 acquires, through the acquisition function 251, the medical data on a patient. The processing circuit 25 acquires, as the medical data, the patient information, the sampling test information, and the vital information from the server device 10. The processing circuit 25 acquires, through the acquisition function 251, the alert information from the server device 10. For example, the medical data and the alert information are transmitted from the server device 10 to the client device 20 every time the medical data is updated in the server device 10. The processing circuit 25 that implements the acquisition function 251 is another example of the acquirer.

The processing circuit 25 causes, through the display control function 252, the display 23 to display various types of information. For example, based on the acquired medical data, the processing circuit 25 causes the display 23 to display a display screen on which measurement values in the medical data are displayed. The processing circuit 25 updates the medical data displayed on the display 23 every time new medical data is acquired. The processing circuit 25 that realizes the display control function 252 is an example of the display controller.

Furthermore, through the display control function 252, the processing circuit 25 highlights an area in the display screen in which the alert value is displayed (hereinafter referred to as a warning area). For example, on the display screen configured to display a graph showing a change over time in a measurement value in the medical data and an alert value, the processing circuit 25 highlights, as the warning area, an area (background area) in the graph corresponding to a time slot in which the alert value is displayed. For example, the processing circuit 25 changes a color of the warning area (hereinafter referred to as a background color) on the display screen to a conspicuous color such as red.

Furthermore, the processing circuit 25 changes, through the display control function 252, a highlight degree of the warning area in accordance with the importance degree relating to the alert value. For example, the processing circuit 25 changes the highlight degree of the warning area by changing a depth of its background color. For example, the processing circuit 25 makes deeper the background color of the warning area in which an alert value is displayed, as the alert value increases in the importance degree. In the case where the remaining areas other than the warning area already have a deep background color, the background color of the warning area may be made lighter to increase its highlight degree.

The importance degree of an alert value is a value indicative of how important the value is. As the importance degree of an alert value, for example, a difference between a threshold value included in a determination condition and the alert value (hereinafter referred to as a difference value), a value present for each item (hereinafter referred to as a set value), or a time period from a measurement time of the alert value to a present time (hereinafter referred to as an elapsed time) is used.

Figure 4:
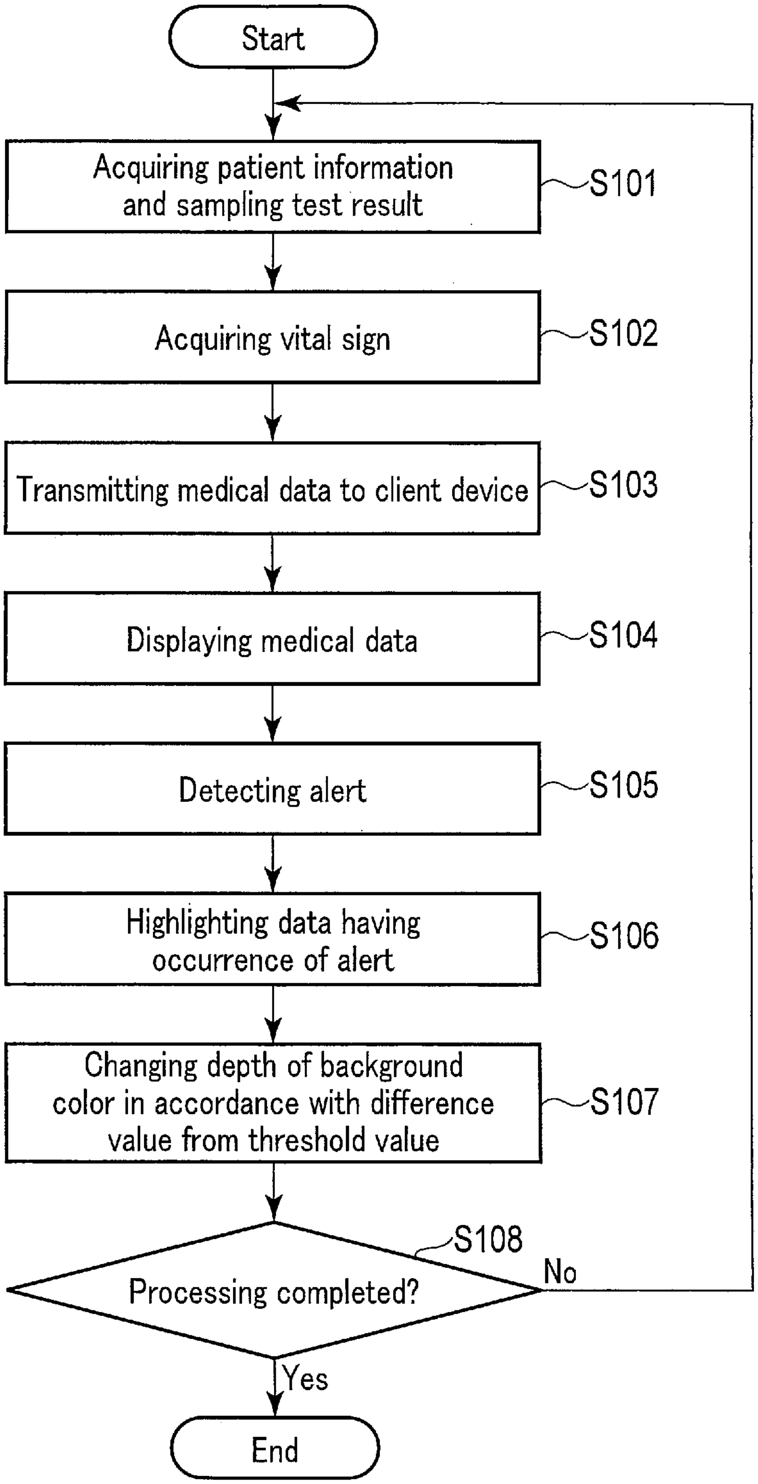
FIG. 4 is a flowchart showing an example of a processing procedure of emergency medical care support processing by the medical support system according to the first embodiment.

Next, the operation of the emergency medical care support processing executed by the medical support system 100 will be described. The emergency medical care support processing causes the display to display medical data on an emergency patient all the time while he or she undergoes a medical examination, and in the case where any one of the measurement values in the medical data satisfies the alert condition, changes the highlight degree in accordance with the importance degree of the alert value. FIG. 4 is a flowchart showing an example of a processing procedure of emergency medical care support processing. The case described below uses, as the importance degree of an alert value, a difference value between the alert value and a threshold value included in a conditional expression representing an alert condition. Note that the processing procedure described below is only an example, and each processing can be changed as appropriate where possible. Omission, replacement, and addition of a step in the processing procedure described hereinafter can be made as appropriate, in accordance with an actual situation where the present embodiment is realized.

(Emergency Medical Care Support Processing)

(Step S101)

The processing circuit 13 of the server device 10 acquires, through the acquisition function 131, the patient information on an emergency patient and the sampling test information including a sampling test result from the medical information database 200. For example, the processing circuit 13 acquires the latest patient information and sampling test information from the medical information database 200 every several tens of minutes, and updates information in the memory 11.

(Step S102)

The processing circuit 13 acquires, through the acquisition function 131, the vital information including a vital sign of an emergency patient from the medical information database 200. For example, the processing circuit 13 acquires the latest vital information from the medical information database 200 every minute, and updates information in the memory 11.

(Step S103)

The processing circuit 13 transmits, through the data distribution function 132, the medial data on the emergency patient to the client device 20. For example, every time the sampling test information or vital information is updated, the processing circuit 13 transmits the updated medical data to the client device 20.

(Step S104)

The processing circuit 25 of the client device 20 receives, through the acquisition function 251, the medical data transmitted from the server device 10. Thereafter, the processing circuit 25 causes, through the display control function 252, the display 23 to display the display screen on which the medical data acquired from the server device 10 is displayed.

Figure 5:
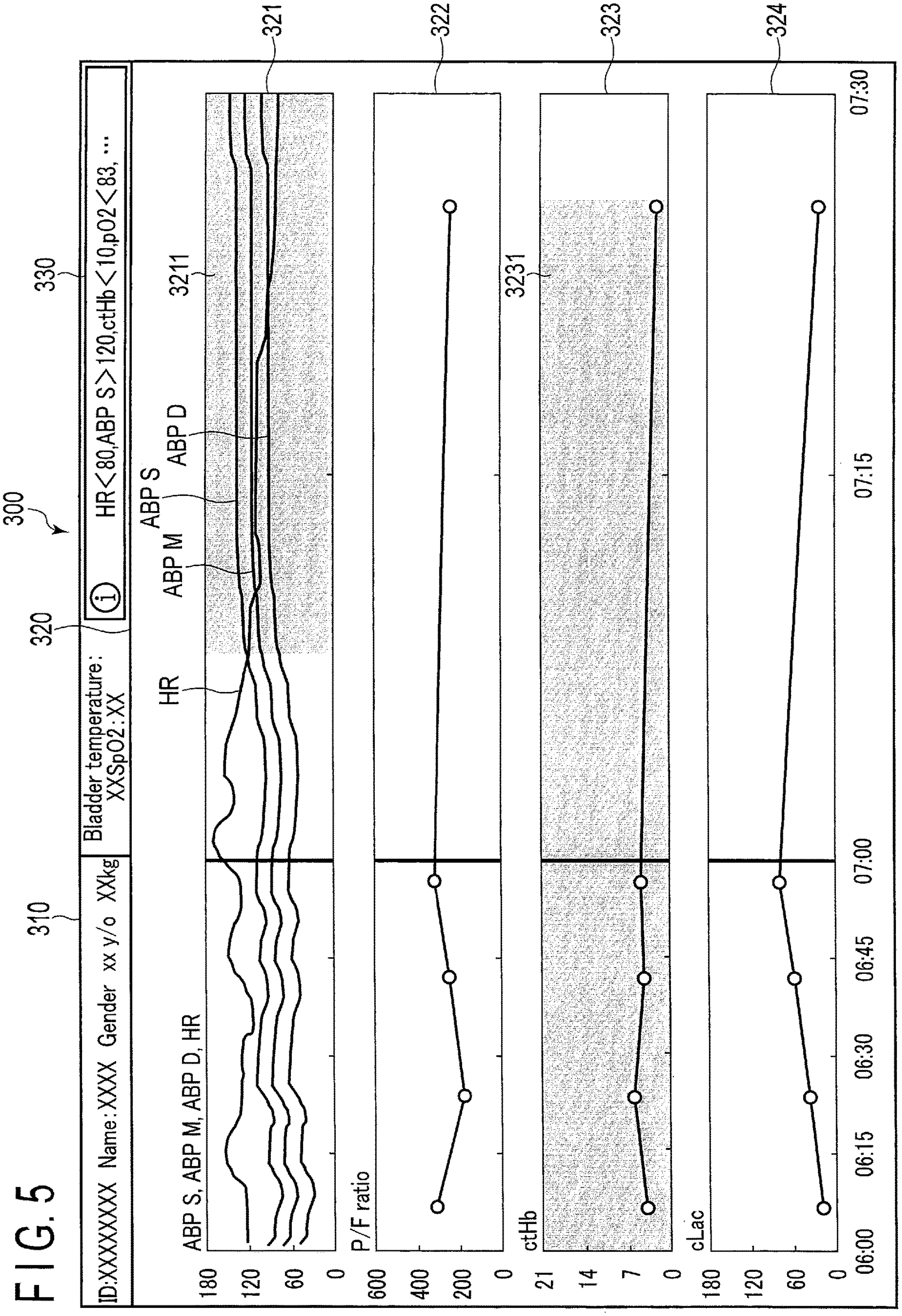
FIG. 5 is a diagram showing an example of a display screen displayed by the medical support system according to the first embodiment.

FIG. 5 is a diagram showing an example of the display screen 300 displayed on the display 23. In the example shown in FIG. 5, the display screen 300 includes a patient information displayer 310 and a medical data displayer 320.

The patient information displayer 310 displays thereon patient information on an emergency patient to be managed. The patient information displayer 310 displays thereon, for example, a name, a gender, an age, and a weight of the patient.

The medical data displayer 320 displays thereon a plurality of graphs indicating a change over time in measurement values of the medical data on the emergency patient. Each item of the medical data displayed on the medical data displayer 320 is preset. In the example shown in FIG. 5, the medical data displayer 320 includes a first displayer 321 indicating a change over time in a heart rate (HR) and respective blood pressure values (ABP S, ABP M, and ABP D), a second displayer 322 indicating a change over time in a P/F ratio, a third displayer 323 indicating a change over time in a hemoglobin concentration (ctHb), and a fourth displayer 324 indicating a change over time in a lactate level (cLac).

(Step S105)

The processing circuit 13 of the server device 10 detects, through the alert detection function 133, the alert value from the medical data using the alert condition. At this time, with respect to the medical data acquired through the processing at step S104, the processing circuit 13 detects, as the alert value, the measurement value indicating the abnormal value, using the alert condition preset for each item. The processing circuit 13 calculates, through the alert detection function 133, the difference value between the alert value and the threshold value, as the importance degree of each detected alert value. The processing circuit 13 transmits, through the data distribution function 132, the alert information including the alert value, the name of the alert item, the alert condition for the alert item, and the importance degree of the alert value to the client device 20.

(Step S106)

The processing circuit 25 of the client device 20 receives, through the acquisition function 251, the alert information from the server device 10. Thereafter, the processing circuit 25 highlights the warning area in which the alert value is displayed on the display screen displayed on the display 23.

FIG. 5 shows the case in which alert values include a measurement value of an upper blood pressure (ABP S) and a measurement value of a hemoglobin concentration (ctHb). In the example shown in FIG. 5, the alert condition for the upper blood pressure (ABP S) is a measurement value of the upper blood pressure (ABP S) being greater than 120, and the alert condition for the hemoglobin concentration (ctHb) is a measurement value of the hemoglobin concentration (ctHb) being smaller than 10.

In the example shown in FIG. 5, a warning area 3211 showing a measurement value greater than 120 is highlighted on the first displayer 321, and a warning area 3231 showing a measurement value smaller than 10 is highlighted on the third displayer 323. The warning areas 3211 and 3231 are highlighted by changing their background color to a color different from those of the remaining areas. For example, the background color of the warning areas 3211 and 3231 is displayed in red.

(Step S107)

The processing circuit 25 calculates, through the display control function 252, the difference value between the alert value and the threshold value for each alert value using the acquired alert information. The processing circuit 25 uses the calculated difference value as the importance degree, thereby highlighting the warning area with the highlight degree in accordance with the importance degree.

Figure 6:
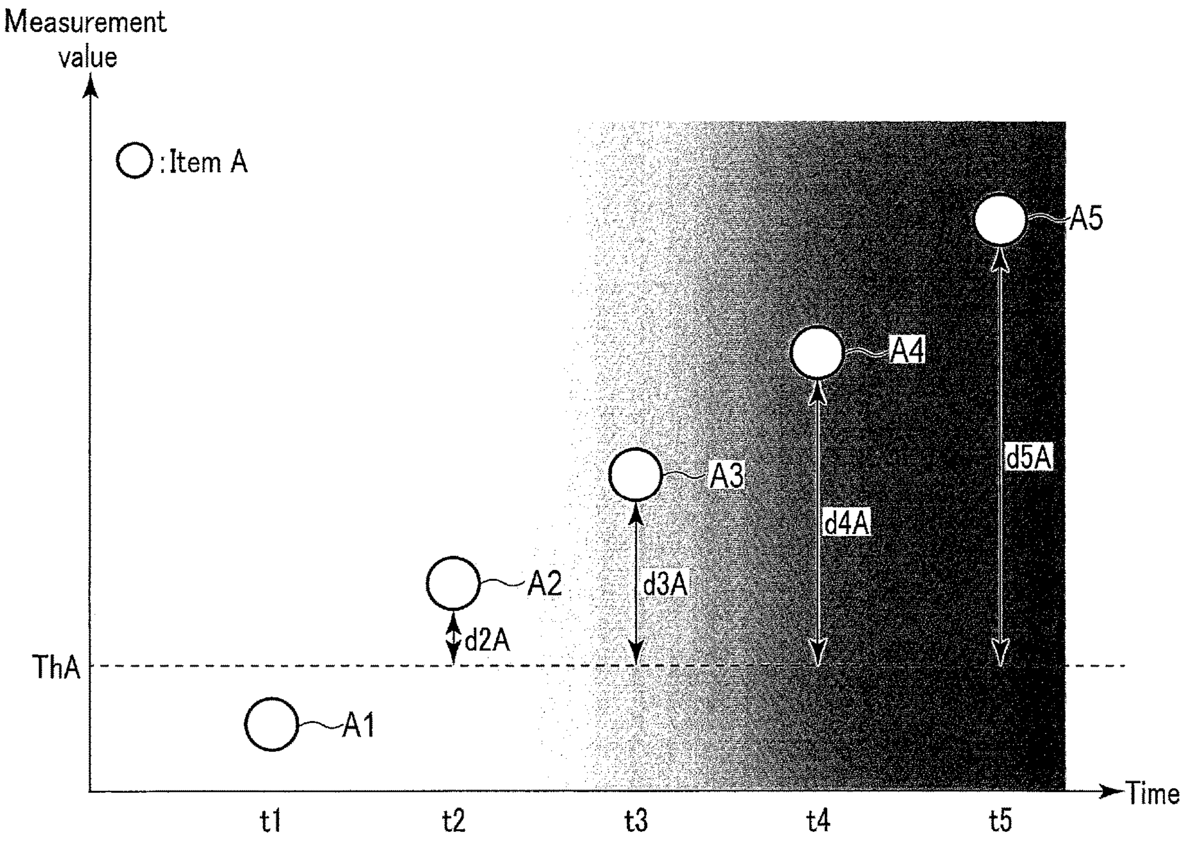
FIG. 6 is a diagram showing an example of a method for the medical support system according to the first embodiment to display a background color.
Figure 7:
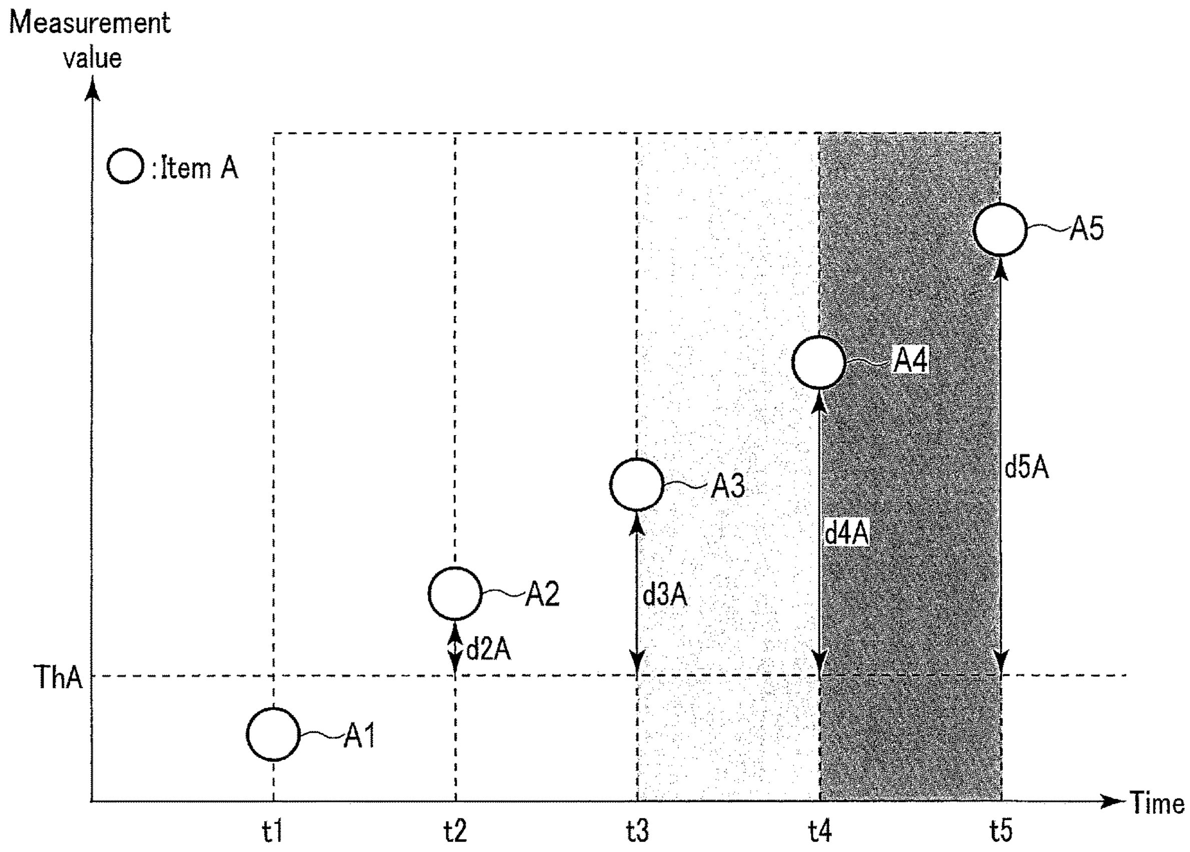
FIG. 7 is a diagram showing an example of a method for the medical support system according to the first embodiment to display a warning area.

FIG. 6 and FIG. 7 are diagrams for explaining an example of a method of displaying medical data. FIG. 6 and FIG. 7 show an example of a method of displaying a graph indicating a change over time in measurement values A1 to A5 of an item A included in the medical data. The display method shown in FIG. 6 and FIG. 7 is applied to a display portion in the medical data displayer 320, in which one graph shows one item. In FIG. 6 and FIG. 7, the horizontal axis represents time and the vertical axis represents a measurement value. The determination condition for the item A is represented as "measurement value>threshold value ThA". Under this condition, a measurement value greater than the threshold value ThA is detected as the alert value.

In the example shown in FIG. 6 and FIG. 7, each of the measurement values A2 to A5 exceeds the threshold value ThA. Therefore, the area in which the measurement values A2 to A5 are displayed is highlighted as the warning area. For example, the warning area is displayed in red. Difference values d2A to d5A between the threshold value ThA and the measurement values A2 to A5 are respectively calculated. In the area in which the measurement values A2 to A5 are displayed, the background color becomes deeper as the difference value increases in order of the difference values d2A to d5A.

In FIG. 6, in portions of the area in which the measurement values A2 to A5 are displayed, a depth of a corresponding background color is determined depending on a corresponding one of the difference values d2A to d5A, and a color value is determined depending on the determined depth of the background color. The background color of each portion between the measurement values is determined in such a manner that the aforementioned area is displayed with its background color continuously varying by gradation.

In FIG. 7, in portions of the area in which the measurement values A2 to A5 are displayed, a depth of a corresponding background color is determined depending on a corresponding one of the difference values d2A to d5A, and a color value is determined depending on the determined depth of the background color. The determined color value is used in a portion extending from a measurement value to its adjacent value. For example, the portion between the measurement values A2 and A3 uses the color value determined depending on the difference value d2A between the measurement value A2 and the threshold value ThA.

(Step S108)

The processing circuit 13 and the processing circuit 25 repeatedly execute the processing from step S101 to step S107 for every predetermined period of time until the treatment on an emergency patient is completed. For example, the processing from step S101 to step S107 is repeatedly executed each time a measurement result of a vital sign is updated every second in the medical information database 200. Furthermore, for example, the processing from step S101 to step S107 is repeatedly executed each time the sampling test information is updated every several tens of minutes in the medical information database 200.

Hereinafter, the effect of the medical support system 100 according to the present embodiment will be described.

The medical support system 100 according to the present embodiment is configured to acquire medical data on a patient over time, cause the display to display the display screen on which measurement values of the medical data are displayed, and detect an alert value from the measurement values included in the medical data. Furthermore, the medical support system 100 is configured to highlight an area in which the alert value is displayed on the display screen and to change the depth of the background color of the warning area depending on the importance degree relating to the alert value. For example, the medical support system 100 is configured to make the background color of the warning area deeper as the importance degree of the alert value increases. In the case where a conditional expression including a threshold value is used as the determination condition for the alert item for which the alert value has been detected, for example, a difference value between the alert value and the threshold value can be used as the importance degree of the alert value.

The configuration described above enables the medical support system 100 according to the present embodiment to execute the alert processing every time the medical data is updated, and updates the display screen based on a detection result of an alert, thereby enabling execution of the alert processing in real time on the acquired medical data. Furthermore, since the alert processing is automatically executed every time the medical data is acquired, a user's operation load can be reduced. This enables the occurrence of an alert to be efficiently reported in emergency medical care.

Furthermore, a user can be warned of the occurrence of an alert by highlighting a warning area in which a corresponding alert value is displayed. In addition, by adjusting the depth of the background color of the area in which the alert value is displayed, in accordance with the importance degree of the alert value, a user can visually grasp, without performing any special operations, the importance degree or urgency degree of the alert.

Modification of First Embodiment

As the importance degree of the alert value, a set value that is preset for each item of the medical data may be used. The set value is a value preset in accordance with the importance degree in emergency medical treatment. The set value may be prestored in the memory 11 or the memory 21, or a user may input a given value as the set value. For example, with both the aforementioned difference value and the set value being used as the importance degree, the background color of the warning area may be changed in accordance with a total value or an average value of the difference value and the set value. Alternatively, only the set value may be used as the importance degree. In this manner, even with alert values with the same amount of deviation from the threshold value, the background color can be changed in accordance with the importance degree of an item.

Furthermore, as the importance degree of an alert value, an elapsed time from a measurement date and time of the alert value to a present time may be used. Since data with a longer elapsed time is older, the importance degree is set to higher as the elapsed time becomes shorter. This increases the importance degree of an alert which has occurred most recently, and this alert is further highlighted. For example, with both the aforementioned difference value and the elapsed time being used as the importance degree, the background color of the warning area may be changed in accordance with a total value or an average value of the difference value and the elapsed value. Alternatively, only the elapsed time may be used as the importance degree.

Second Embodiment

The second embodiment will be described. The present embodiment is a modification of the configuration of the first embodiment as will be described below. In the present embodiment, in the case where alerts occur simultaneously in a plurality of items shown in the same graph, a color obtained by mixing colors respectively set for the items is displayed. Descriptions of configurations, operations, and advantageous effects similar to those of the first embodiment will be omitted.

The processing circuit 25 of the client device 20 sets, through the display control function 252, a display color that is different for each item of the medical data, and displays the background color of the warning area in a color obtained by combining display colors of a plurality of items respectively corresponding to a plurality of alert values displayed in the warning area. The display color is, for example, set in advance for each item and is stored in the memory 21. For example, in the area in which measurement values of the medical data for a plurality of items are displayed, suppose that a measurement value of a first item and a measurement value of a second item, which are measured at the same time, satisfy their determination conditions, respectively, and are both detected as alert values. In this case, a color obtained by combining a display color of the first item with a display color of the second item is used as the background color. For example, in the case where the display color of the first item is red, and the display color of the second item is green, a color used as the background color is yellow, obtained by combining red with green.

Figure 8:
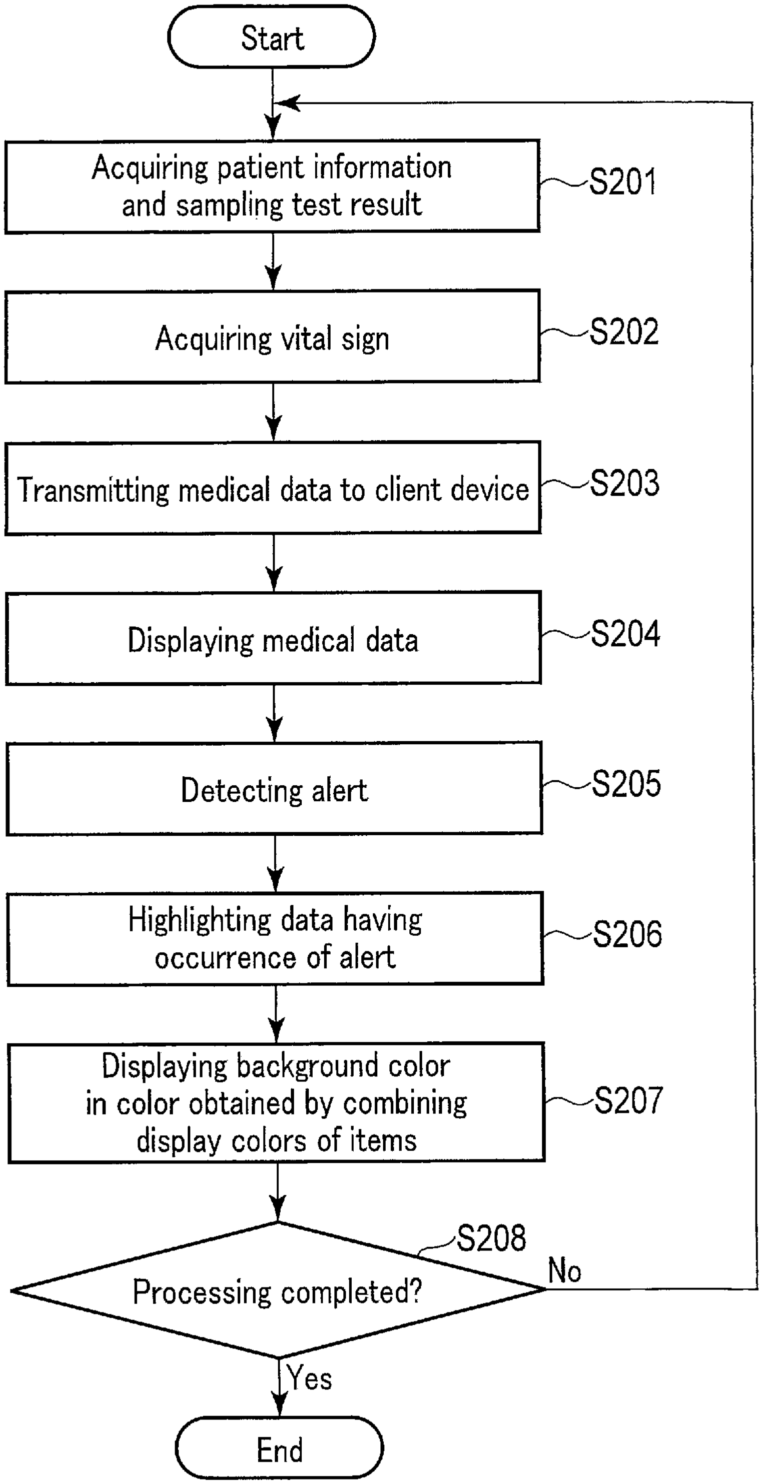
FIG. 8 is a flowchart showing an example of a processing procedure of emergency medical care support processing by a medical support system according to a second embodiment.

Next, the operation of the emergency medical care support processing executed by the medical support system 100 according to the present embodiment will be described. FIG. 8 is a flowchart showing an example of a processing procedure of emergency medical care support processing. Since the processing at steps S201 to S206 and S208 is the same as the processing at steps S101 to S106 and S108 in FIG. 4, descriptions thereof are omitted.

(Emergency Medical Care Support Processing)

(Step S207)

Next, in the case where the plurality of items are shown in the same graph in the warning area, the processing circuit 25 displays, through the display control function 252, the warning area with the background color obtained by combining display colors of these items.

Figure 9:
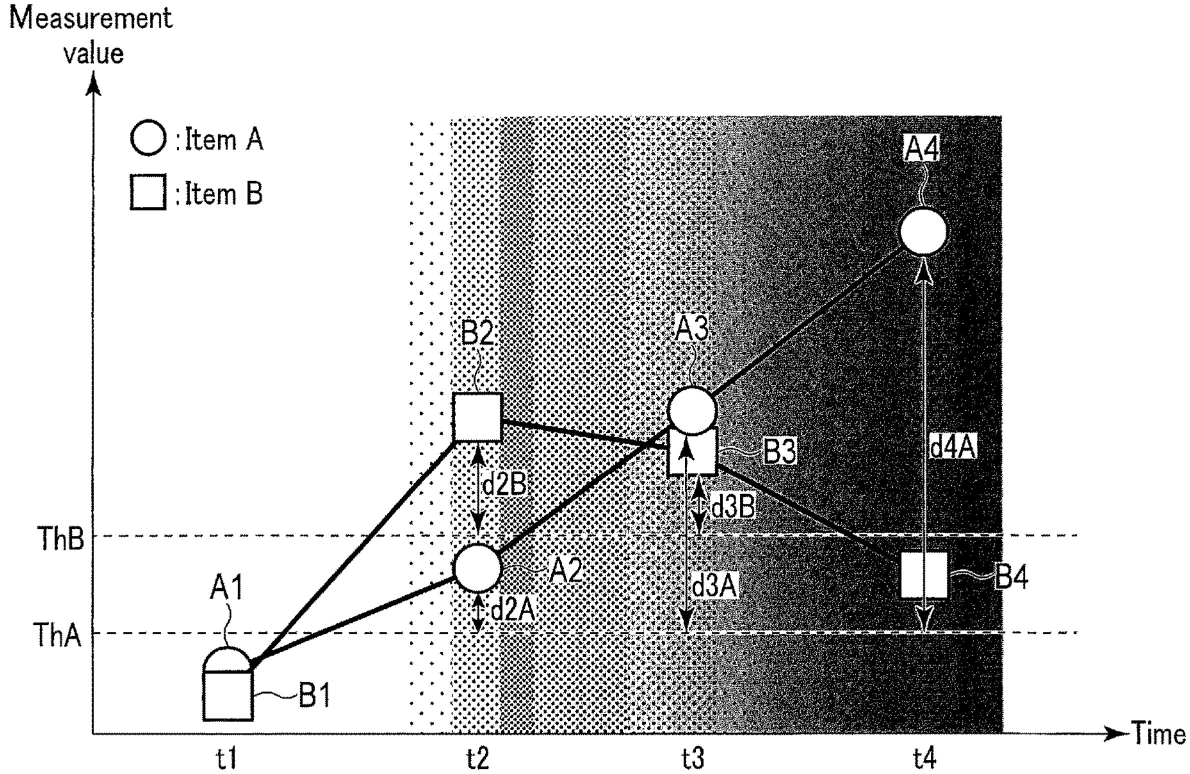
FIG. 9 is a diagram showing an example of a method for the medical support system according to the second embodiment to display a warning area.

FIG. 9 is a diagram showing an example of a method for the medical support system 100 according to the present modification to display the warning area. FIG. 9 shows a graph showing a change over time from the measurement value A1 to the measurement value A5 of the item A included in the medical data and a graph showing a change over time from the measurement value B1 to the measurement value B5 of the item B. The display method shown in FIG. 9 is applied to a display portion in the medical data displayer 320, in which one graph shows a plurality of items. In FIG. 9, the horizontal axis represents time and the vertical axis represents a measurement value. The determination condition for the item A is represented as "measurement value>threshold value ThA". Of the measurement values of the item A under this condition, a measurement value greater than the threshold value ThA is detected as the alert value. The determination condition for the item B is represented as "measurement value>threshold value ThB". Of the measurement values of the item B under this condition, a measurement value greater than the threshold value ThB is detected as the alert value. Furthermore, red is set to a display color of the item A, and green is set to a display color of the item B. In FIG. 9, the background color of red is represented as a shade of gray, and the background color of green is represented by dots. In FIG. 9, a darker shade of gray indicates deeper red, and denser dots indicate deeper green.

At a time t1 in the example shown in FIG. 9, the measurement values A1 and B1 are smaller than the threshold values and thus each fail to satisfy the determination conditions for an alert. Therefore, the background color of the measurement values A1 and B1 at the time t1 adopts, for example, white, not the display colors of the items A and B. At a time t2, the measurement value A2 is greater than the threshold value ThA, and the measurement value B2 is greater than the threshold value ThB. Therefore, the background color of the measurement values A2 and B2 at the time t2 adopts a color obtained by combining the display color of the item A with the display color of the item B. For example, in the case where the display color of the item A is red (R) and the display color of the item B is green (G), the background color of the measurement values A2 and B2 is represented by a color value obtained by combining a color value of the red (R) according to the difference value d2A with a color value of the green (G) according to the difference value d2B. At the time t2, the item B is more deviated from its corresponding threshold value than the item A. This results in the difference value d2B being greater than the difference value d2A at the time t2. Thus, the background color corresponding to the time t2 is closer to green, which is the display color of the item B. As described above, the area in which the difference value d2B is much greater than the difference value d2A is displayed using a color closer to green, which is the display color of the item B. The area in which the difference d2A is much greater than the difference value d2B is displayed in a color closer to red, which is the display color of the item A. The area in which the difference value d2B and the difference value d2A are close to each other is displayed in a color which is obtained by combining red, which is the display color of the item A, with green, which is the display color of the item B.

Each portion between the measurement values may be displayed in such a manner that its background color continuously varies by gradation as with FIG. 6, or may be displayed in such a manner that a determined color is used from one measurement value to its adjacent value as with FIG. 7.

Hereinafter, the effect of the medical support system 100 according to the present embodiment will be described.

The medical support system 100 according to the present embodiment is configured to set a display color that is different for each item of the medical data, and to display the background color of the warning area in a color obtained by combining display colors of a plurality of items displayed in the warning area. With this configuration, even in the case where alerts have occurred in the plurality of data items in the same graph, a user can discriminate between the alerts that have occurred in terms of which item corresponds to each alert by viewing a corresponding background color. Furthermore, displaying the background color obtained by combining color values respectively according to the importance degrees of the items enables displaying a color that reflects the importance degrees of the items. By viewing the background color, a user determines which item corresponds to each alert that has occurred and also grasps the importance degree of each alert in each item, thereby enabling using this information in making a decision in emergency medical treatment.

Modification of Second Embodiment

A modification of the second embodiment will be described. The present modification is a modification of the configuration of the second embodiment, as will be described below. In the present modification, in the case where alerts occur simultaneously in a plurality of items shown in the same graph, a background color is changed in accordance with the relevance between the items. Descriptions of configurations, operations, and advantageous effects similar to those of the second embodiment will be omitted.

The processing circuit 25 of the client device 20 acquires, through the acquisition function 251, a relevance degree for each combination of items simultaneously shown in one graph on the display screen. The relevance degree is a value representing the relevance between items. The relevance degree may also be referred to as a similarity degree. As items are more likely to exhibit abnormal values simultaneously when, for example, the symptoms of serious disease occur, a greater value is set to their relevance degree. For example, massive bleeding increases a pulse rate value and decreases a blood pressure value, and thereby alerts tend to simultaneously occur in both the pulse rate value and the blood pressure value in this case. Therefore, the relevance degree between the pulse rate value and the blood pressure value is set to a great value. Alternatively, a greater value is set to the relevance degree between items for which alerts have simultaneously occurred in the past more often. Alternatively, a greater value is set to the relevance degree between items for which it is desirable to view simultaneously. The relevance degree between a plurality of items included in the medical data is prestored in, for example, the memory 21 or the memory 11 of the server device 10.

The processing circuit 25 changes, through the display control function 252, the background color of the warning area in accordance with the relevance degree between a plurality of items respectively corresponding to a plurality of alert values displayed in the warning area. For example, in the area in which a plurality of items are shown in one graph, in the case where alerts simultaneously occur in more than one item, the processing circuit 25 reads a relevance degree between the items in which the alerts have occurred, and changes, in accordance with the relevance degree, a depth of the background color of the warning area in which alert values of these alerts are displayed. For example, in the case of the relevance degree between items being higher, the processing circuit 25 sets a greater value of the importance degree between these items and makes the background color of a corresponding warning area deeper.

Figure 10:
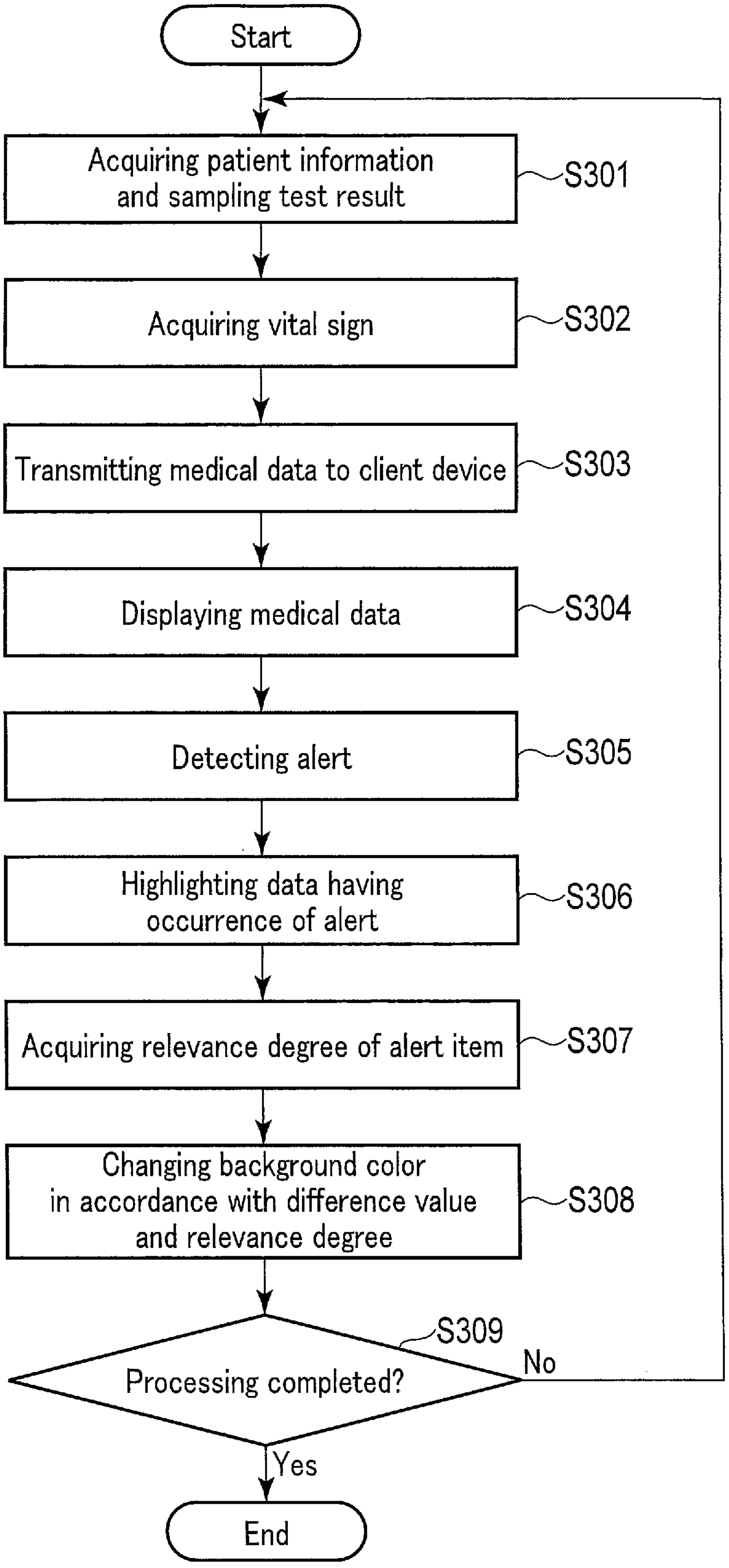
FIG. 10 is a flowchart showing an example of a processing procedure of emergency medical care support processing by the medical support system according to a modification of the second embodiment.

Next, the operation of the emergency medical care support processing executed by the medical support system 100 according to the present modification will be described. FIG. 10 is a flowchart showing an example of a processing procedure of emergency medical care support processing. Since the processing at steps S301 to S306 and S309 is the same as the processing at steps S201 to S206 and S208 in FIG. 8, descriptions thereof are omitted.

(Emergency Medical Care Support Processing)

(Step S307)

In the area in which a plurality of items are simultaneously shown in one graph, in the case where a plurality of measurement values measured at the same time are detected as alert values, the processing circuit 25 of the client device 20 acquires, through the acquisition function 251, the relevance degree for each combination of these items for which the alert values have been detected. The relevance degree is read from, for example, the memory 21.

For example, at the time t2 in the example shown in FIG. 9, the measurement value A2 of the item A and the measurement value B2 of the item B respectively exceed their corresponding threshold values, so that the measurement value A2 and the measurement value B2 are detected as the alert values. Thus, the processing circuit 25 reads the relevance degree between the item A and the item B from the memory 21.

(Step S308)

As with the first embodiment, the processing circuit 25 calculates, through the display control function 252, the difference value between the alert value and the threshold value for each alert value using the acquired alert information. The processing circuit 25 uses the calculated difference value as the importance degree, thereby highlighting the warning area with the highlight degree in accordance with the importance degree. At this time, in the warning area in which alert values are displayed for a plurality of items, the processing circuit 25 determines the importance degree in accordance with the relevance degree and the difference value acquired at step S308.

For example, at the time t2 in the example shown in FIG. 9, the measurement value A2 of the item A and the measurement value B2 of the item B respectively exceed their corresponding threshold values, so that the measurement value A2 and the measurement value B2 are detected as the alert values. Thus, the processing circuit 25 reads the relevance degree between the item A and the item B from the memory 21.

For example, in the example shown in FIG. 9, in the case where the item A corresponds to a "pulse rate value" and the item B corresponds to a "blood pressure value", the relevance degree between the item A and the item B is high. Thus, the importance degree of the item A and the importance degree of the item B are set to greater values, and the background colors of the times t2 to t4 at which both of the measurement values for the item A and the item B are detected as alert values are displayed in deeper colors.

Hereinafter, the effect of the medical support system 100 according to the present modification will be described.

The medical support system 100 according to the present modification is capable of changing the background color of the warning area by changing the relevance degree between a plurality of items displayed in the warning area. With this configuration, even in the case where the importance degree of the item A for which an alert has occurred is low, if the simultaneous occurrence of the item A and the item B is of importance, the importance degree of the item A is set to high, so that a corresponding background color is displayed in a deeper color. As described above, the depth of the background color of the warning area is changed in light of the relevance degree between items, so that a user can precisely grasp the importance degree at the occurrence of an alert.

Third Embodiment

Next, the third embodiment will be described. The present embodiment is a modification of the configuration of the second embodiment as will be described below. In the present embodiment, in the case where alerts have occurred in a plurality of data items, similar data items are integrally displayed. Descriptions of configurations, operations, and advantageous effects similar to those of the second embodiment will be omitted.

The processing circuit 25 of the client device 20 acquires, through the acquisition function 251, a relevance degree between an alert item for which an alert value has been detected and another item. Based on the acquired relevance degree, an item (hereinafter referred to as a relevant item) having a high relevance degree with the alert item is extracted. The relevance degree herein is the same as that of the second embodiment, so that the description thereof will be omitted. The relevant item may also be referred to as a similar item. All of the items each having a relevance degree greater than a predetermined threshold value may be extracted as relevant items, or a predetermined number of items may be extracted as relevant items in descending order of relevance degree.

The processing circuit 25 displays, through the display control function 252, an alert item for which an alert item has been detected and a relevant item having a high relevance degree with respect to the alert item, in the same area. Specifically, the processing circuit 25 displays a graph showing a change over time in the measurement value of the alert item and a graph showing a change over time in the measurement value of the relevant item, in an overlapping manner in the same area using the same time axis. At this time, of the relevant items, only an item for which an alert has occurred simultaneously with an alert of the alert item may be shown in the same graph as the alert item. Regardless of whether an alert has occurred or not, all of the items extracted as the relevant items may be shown in the same graph as an alert item.

On the display screen, in the case where a graph showing a change over time in the measurement value of a relevant item is displayed in an area different from an area in which an alert item is displayed, the processing circuit 25 integrates the relevant item and the alert item and shows them in one graph. Furthermore, in the case where a graph showing a change over time in the measurement value of a relevant item is not displayed on the display screen, a graph for the relevant item is displayed in an overlapping manner on a graph for an alert item.

Figure 11:
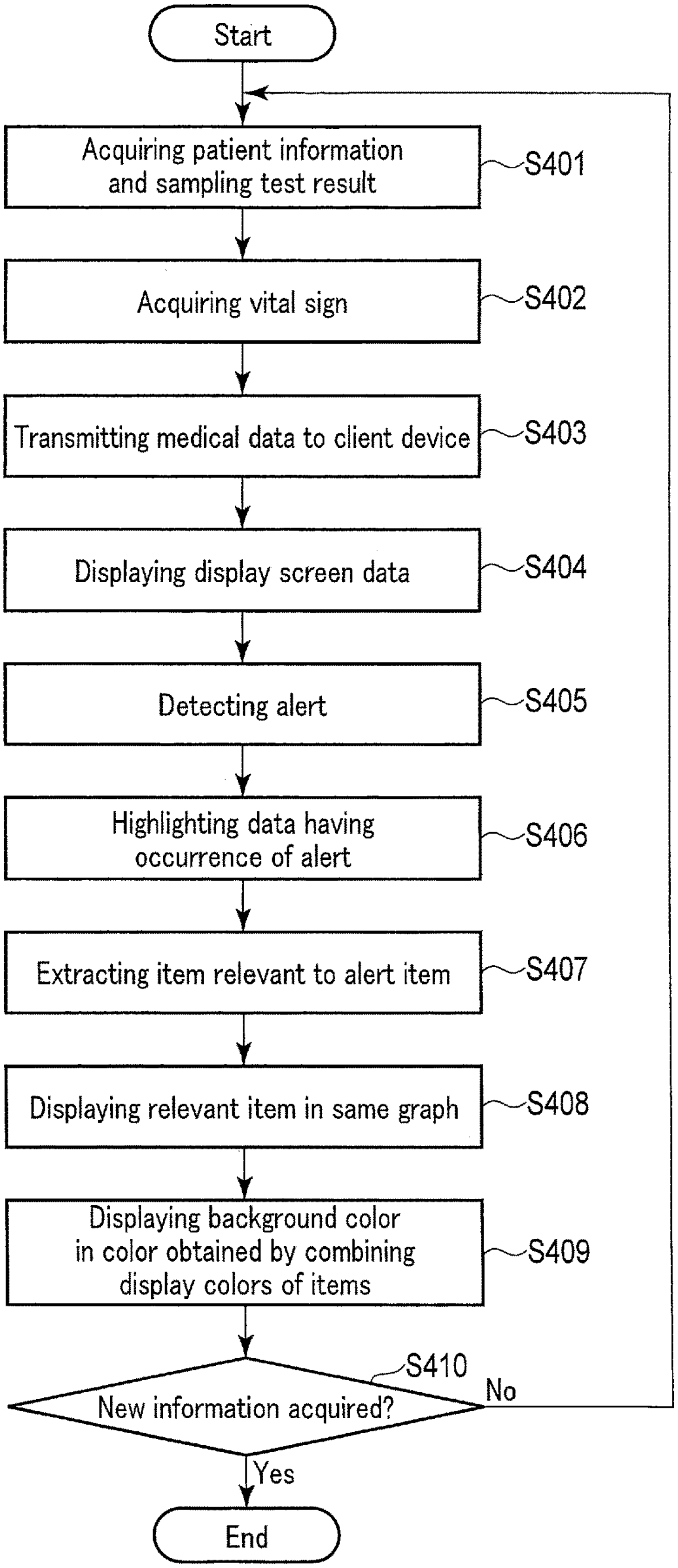
FIG. 11 is a flowchart showing an example of a processing procedure of emergency medical care support processing by a medical support system according to a third embodiment.

Next, the operation of the emergency medical care support processing executed by the medical support system 100 according to the present embodiment will be described. FIG. 11 is a flowchart showing an example of a processing procedure of emergency medical care support processing. Since the processing at steps S401 to S406 and S409 to S410 is the same as the processing at steps S201 to S208 in FIG. 8, descriptions thereof are omitted.

(Emergency Medical Care Support Processing)

(Step S407)

The processing circuit 25 of the client device 20 acquires, through the acquisition function 251, a relevance degree for each item of the medical data. The relevance degree is read from, for example, the memory 21. The processing circuit 25 extracts a relevant item of an alert value based on the acquired relevance degree. For example, an item whose relevance degree with an alert item for which an alert value has been detected is greater than a predetermined value is extracted as a relevant item.

(Step S408)

Next, the processing circuit 25 displays in the same area, through the display control function 252, a graph showing a change over time in the measurement value of the alert item, and a graph showing a change over time in the measurement value of the relevant item.

Figure 12:
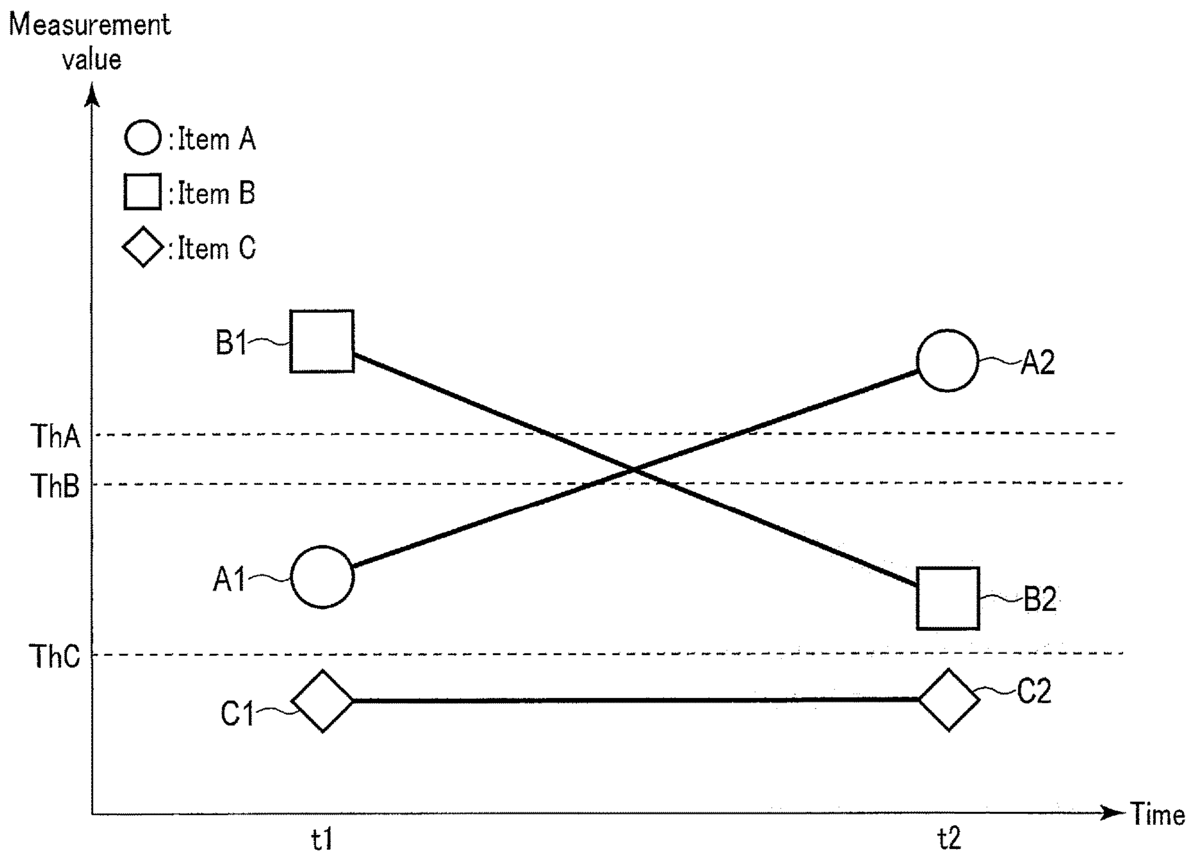
FIG. 12 is a diagram showing an example of a method for the medical support system according to the third embodiment to display a warning area.

FIG. 12 is a diagram showing an example of a method for the medical support system 100 according to the present embodiment to display the medical data. In FIG. 12, a graph showing a change over time in the measurement value of the item A, a graph showing a change over time in the measurement value of the item B, and a graph showing a change over time in the measurement value of the item C, in which the items A, B, and C are included in the medical data, are displayed in the same area. The example shown in FIG. 12 applies to any of the display portions displayed on the medical data displayer 320 in FIG. 5, for example. In FIG. 12, the horizontal axis represents time and the vertical axis represents a measurement value.

In the example shown in FIG. 12, the graphs of the items B and C both extracted as the relevant items of the item A are displayed in the same area as the graph of the item A.

In FIG. 12, the determination condition for the item A is represented as “measurement value>threshold value ThA”. Of the measurement values of the item A under this condition, a measurement value greater than the threshold value ThA is detected as the alert value. The determination condition for the item B is represented as “measurement value<threshold value ThB”. Of the measurement values of the item B under this condition, a measurement value smaller than the threshold value ThB is detected as the alert value. The determination condition for the item C is represented as “measurement value>threshold value ThC”. Of the measurement values of the item C under this condition, a measurement value greater than the threshold value ThC is detected as the alert value. Furthermore, red is set to a display color of the item A, green is set to a display color of the item B, and blue is set to a display color of the item C. In FIG. 12, as with FIG. 6, an importance degree is determined in accordance with a difference value between a measurement value and a threshold value, and a depth of a background is determined in accordance with the importance degree. In FIG. 12, the background color of yellow obtained by combining red with green is represented by a shade of gray, and a darker shade of gray indicates deeper yellow. Each portion between the measurement values may be represented in such a manner that its background color continuously varies by gradation as with FIG. 6, and may be displayed in such a manner that a determined color is used from one measurement value to its adjacent value, as with FIG. 7.

At the time t1 in the example shown in FIG. 12, the measurement values A1, B1, and C1 each fail to satisfy the corresponding determination condition for an alert. Therefore, the background color of the measurement values A1, B1, and C1 at the time t1 adopts, for example, white, not the display colors for the items A, B, and C. At the time t2, the measurement values A1 and B1 each satisfy the corresponding determination condition for an alert whereas the measurement value C1 fails to satisfy the corresponding determination condition for an alert. Thus, the background color of the measurement values A2, B2, and C2 at the time t2 is displayed in yellow obtained by combining red (R), which is the display color of the item A, with green (G), which is the display color of the item B.

Hereinafter, the effect of the medical support system 100 according to the present embodiment will be described.

The medical support system 100 according to the present embodiment enables an alert item in which an alert value has been detected and a relevant item having a high relevance degree with the alert item to be displayed in the same area. Accordingly, in the case where alerts have occurred in a plurality of data items, similar data items are automatically integrated and displayed. This improves the viewability of measurement values of highly relevant items for which it is desirable to view simultaneously.

According to at least one embodiment described above, a user can easily grasp the importance degree of an alert that has occurred in emergency medical care.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical support system, comprising:

processing circuitry configured to:

acquire medical data on a specific patient over time;

cause a display to display a display screen on which one or more measurement values in the medical data are displayed;

detect an alert value that satisfies a determination condition from the one or more measurement values included in the medical data every time the medical data is acquired; and highlight a warning area corresponding to a time slot in which the alert value is displayed, the warning area being included in an area displaying a graph of the acquired medical data on the display screen, and change a depth of a background color of the warning area in accordance with an importance degree relating to the alert value, wherein the importance degree includes an elapsed time from a measurement time of the alert value to a present time, and a greater value of the importance degree is set as the elapsed time from the measurement time of the alert value to the present time becomes shorter, and the depth of the background color of the warning area is changed such that the background color of the warning area becomes deeper as the elapsed time from the measurement time of the alert value to the present time becomes shorter.

2. The medical support system according to claim 1, wherein the processing circuitry is further configured to make the background color of the warning area deeper as the importance degree relating to the alert value increases.

3. The medical support system according to claim 1, wherein the determination condition is a conditional expression including a threshold value, and the importance degree includes a difference value between the alert value and the threshold value.

4. The medical support system according to claim 1, wherein the importance degree includes a set value preset for each item of the medical data.

5. The medical support system according to claim 1, wherein the processing circuitry is further configured to set a display color that is different for each item of the medical data, and display the background color of the warning area in a color obtained by combining display colors of a plurality of items respectively corresponding to a plurality of alert values displayed in the warning area.

6. The medical support system according to claim 1, wherein the processing circuitry is further configured to change the background color of the warning area in accordance with a relevance degree between a plurality of items respectively corresponding to a plurality of alert values displayed in the warning area.

7. The medical support system according to claim 1, wherein the processing circuitry is further configured to display an item in which the alert value has been detected and another item having a high relevance degree with the item in which the alert value has been detected in an identical area.

* * * * *